(12) United States Patent
Schmidt et al.

(10) Patent No.: US 7,185,730 B2
(45) Date of Patent: Mar. 6, 2007

(54) HYDRAULIC STEERING ARRANGEMENT

(75) Inventors: Bjarne Schmidt, Augustenborg (DK); Niels Bjarne Hansen, Aabenraa (DK)

(73) Assignee: Sauer-Danfoss Aps, Nordborg (DK)

( * ) Notice: Subject to any disclaimer, the term of this patent is extended or adjusted under 35 U.S.C. 154(b) by 0 days.

(21) Appl. No.: 11/303,562

(22) Filed: Dec. 15, 2005

(65) Prior Publication Data
US 2006/0131098 A1    Jun. 22, 2006

(30) Foreign Application Priority Data
Dec. 18, 2004   (DE) .............. 10 2004 061 077

(51) Int. Cl.
*B62D 5/00* (2006.01)
*B62D 5/06* (2006.01)
(52) U.S. Cl. ...................... 180/403; 180/417
(58) Field of Classification Search ............... 180/403, 180/417
See application file for complete search history.

(56) References Cited

U.S. PATENT DOCUMENTS
6,971,472 B2  12/2005  Pedersen et al. ........... 180/403

FOREIGN PATENT DOCUMENTS
DE  102 57 130 A1  7/2004
EP  1 447 307 A2   8/2004

*Primary Examiner*—Lesley D. Morris
*Assistant Examiner*—Marc A. Scharich
(74) *Attorney, Agent, or Firm*—McCormick, Paulding & Huber LLP

(57) ABSTRACT

The invention concerns a hydraulic steering arrangement (1) with a supply connection arrangement having at least a high-pressure connection (P) and a low-pressure connection (T), a working connection arrangement having at least two working connections (L, R), a steering unit (7), which can be activated by a steering transducer (2), the steering unit having a first load-sensing connection (LS1), and a steering valve (8) having a second load-sensing connection (LS2), the steering unit (7) and the steering valve (8) being arranged in parallel with each other between the supply connection arrangement and the working connection arrangement. It is endeavoured to ensure a good steering behaviour. For this purpose, a priority valve (12) is connected in series with the high-pressure connection (P), said priority valve (12) having a third load-sensing connection (LS3), which is connected with the first load-sensing connection (LS1) via a pipe (23), in which is located a control valve (24) that can be activated by the second load-sensing connection (LS2).

9 Claims, 1 Drawing Sheet

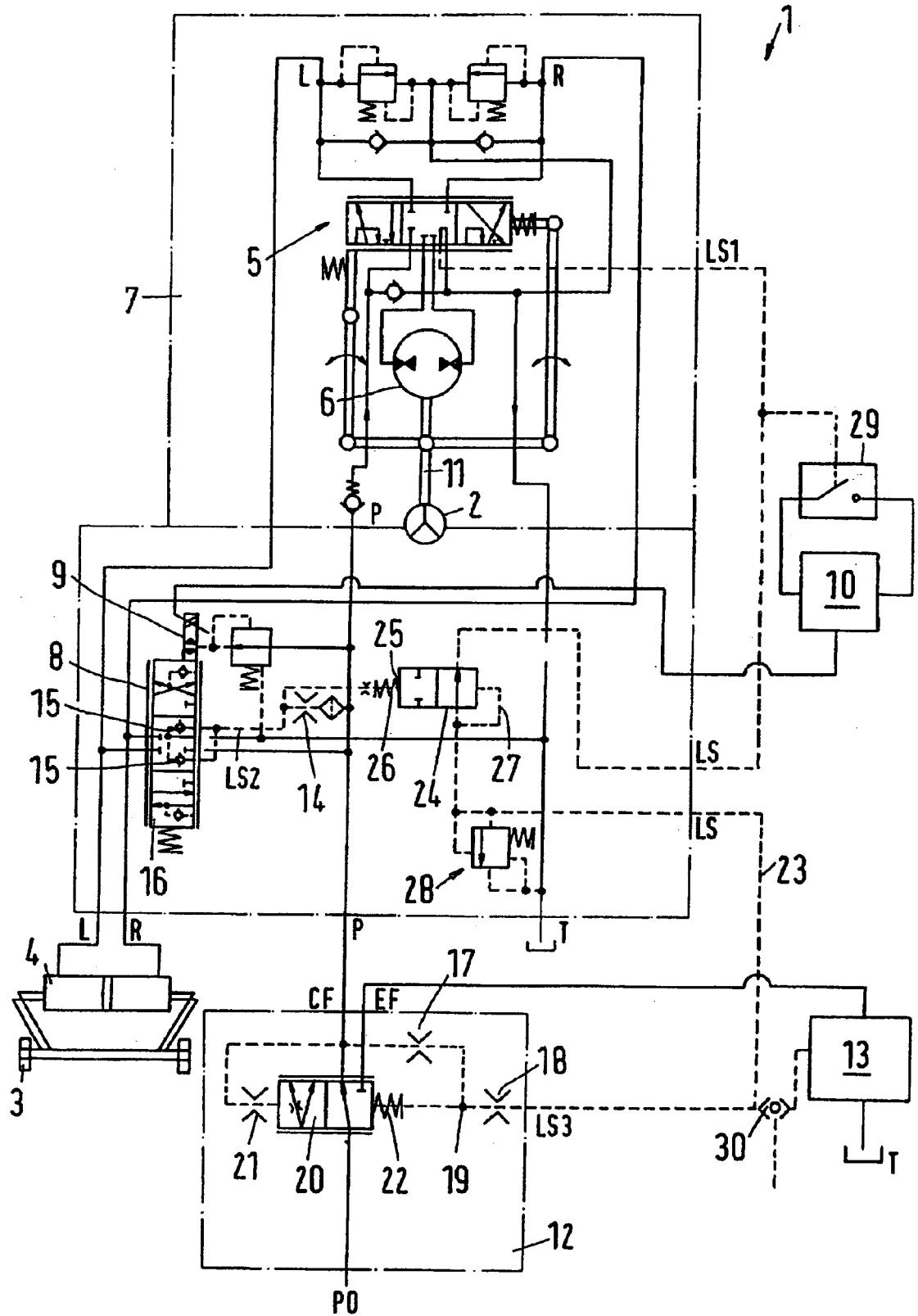

HYDRAULIC STEERING ARRANGEMENT

CROSS-REFERENCE TO RELATED APPLICATIONS

Applicant hereby claims foreign priority benefits under U.S.C. § 119 from German Patent Application No. 10 2004 061 077.0 filed on Dec. 18, 2004, the contents of which are incorporated by reference herein.

FIELD OF THE INVENTION

The invention concerns a hydraulic steering arrangement with a supply connection arrangement having at least a high-pressure connection and a low-pressure connection, a working connection arrangement having at least two working connections, a steering unit, which can be activated by a steering transducer, the steering unit having a first load-sensing connection, and a steering valve having a second load-sensing connection, the steering unit and the steering valve being arranged in parallel with each other between the supply connection arrangement and the working connection arrangement.

BACKGROUND OF THE INVENTION

Such a steering arrangement is, for example, known from DE 102 57 130 A1. In common, the steering unit and the steering valve can act upon a steering motor. This has the advantage that the steering unit, which is usually provided with a measuring motor, can have smaller dimensions. The measuring motor, which is used for activating the steering motor on failing supply pressure, can then be activated with smaller force expenditure.

A similar embodiment of a steering arrangement is known from EP 1 447 307 A2. Also here, the steering motor can be activated by the steering unit or the steering valve or both in common.

When such a steering arrangement is now used in a vehicle, which additionally has other hydraulic consumers, for example working hydraulics, it is difficult to ensure the "correct" supply for the steering arrangement. Under certain circumstances, this can cause a somewhat problematic steering behaviour.

BRIEF SUMMARY OF THE INVENTION

The invention is based on the task of ensuring a good steering behaviour.

With a hydraulic steering arrangement as mentioned in the introduction, this task is solved in that a priority valve is connected in series with the high-pressure connection, said priority valve having a third load-sensing connection, which is connected with the first load-sensing connection via a pipe, in which is located a control valve that can be activated by the second load-sensing connection.

With such an embodiment, it is firstly ensured that the steering arrangement on a whole is supplied with the required pressure via the priority valve. The priority valve has a priority outlet, which is connected with the high-pressure connection of the steering unit. The priority outlet is the outlet, which has higher priority in being supplied with pressurised hydraulic fluid. The working hydraulics, however, is located at an outlet, which has low priority in being supplied with hydraulic fluid. For this purpose, the priority valve often has a slide, which is exposed to a control pressure. This control pressure, for example, corresponds to the pressure at the third load-sensing connection. When, now, the first load-sensing connection, that is, the load-sensing connection at the steering unit, is connected with the third load-sensing connection, that is, the load-sensing connection at the priority valve, the priority valve receives information about the load state at the steering unit. When, then, a control valve is built into this connection, said control valve being controlled via the pressure at the second load-sensing connection, that is, at the load-sensing connection of the steering valve, the priority valve can also receive information about the pressure at the load-sensing connection of the steering valve. Thus, when the steering valve is activated, also the pressure at the third load-sensing connection increases, so that also in this case the priority valve can be activated accordingly.

Preferably, the control valve forms a throttle, whose resistance can be changed by the pressure at the second load-sensing connection. This is a relatively simple way of reporting a load change at the steering valve to the priority valve. A supply of hydraulic fluid from the second lad-sensing connection into the connection between the first and the third load-sensing connections is not required.

Preferably, the priority valve has a connection between its priority outlet and the third load-sensing connection, in which a throttle arrangement is located. Thus, the priority valve is a "dynamic" priority valve, which can react relatively fast to load changes. The throttle arrangement prevents an unthrottled outlet of hydraulic fluid from the priority outlet to the load-sensing connection. However, it permits a relatively fast passing on of pressures from the priority outlet to the third load-sensing connection.

It is preferred that the throttle arrangement has a central outlet, whose pressure acts upon a control slide in a direction, in which the priority outlet is connected with the pressure inlet. Thus, a pressure divider is formed between the priority outlet and the third load-sensing connection, so that the pressure acting upon the control slide of the priority valve is somewhat higher than the pressure at the third load-sensing connection. This further improves the response time of the priority valve without significantly stressing the load-sensing system, which is located at the load-sensing connections.

Preferably, the second load-sensing connection is connected with the high-pressure connection via a bleed. Thus, it can be ensured that the second load-sensing connection is always supplied with sufficient pressure.

It is preferred that in the neutral position of the steering valve, the second load-sensing connection is connected with the low-pressure connection. As long as the steering valve is in the neutral position, the pressure at the second load-sensing connection corresponds to the pressure at the low-pressure connection, that is, usually the tank pressure. As soon as the steering valve is displaced from its neutral position, the high-pressure connection immediately supplies pressure via the bleed, which pressure can then be used for controlling the control valve.

Preferably, the first load-sensing connection is connected with a pressure switch, which changes over, when a predetermined pressure is exceeded. When interventions in the connection between the first load-sensing connection and the third load-sensing connection are made with the control by means of the control valve on the basis of the pressure at the second load-sensing connection, a very stable pressure in the pipe between the control valve and the first load-sensing connection is achieved. Thus, the switching time of the pressure switch is very easily defined. Such a pressure switch can be used for various purposes.

Particularly preferred, however, is that the pressure switch is connected with a control device, which controls the steering valve. When the pressure switch is activated, the control device "knows" that the steering unit has an increased pressure requirement. The control device can then control the steering valve accordingly.

In a preferred embodiment, it is ensured that the control device controls the steering valve to its neutral position, when the predetermined pressure is exceeded. Such an embodiment is, for example, advantageous, when the vehicle equipped with the steering arrangement is remote controlled, and the steering valve is used for this purpose. When, now, the user activates the steering unit, for example via the steering handwheel or another steering means, the steering unit shall apparently have priority in the steering of the vehicle. Therefore, the control through the steering valve is postponed.

BRIEF DESCRIPTION OF THE DRAWINGS

In the following, the invention is described on the basis of a preferred embodiment in connection with the drawing, showing:

FIG. 1 is a schematic view of a steering arrangement.

DETAILED DESCRIPTION OF THE INVENTION

A steering arrangement 1 exists in the form of a fully hydraulic steering; no active mechanical connection exists between a steering handwheel 2 or another steering means and steered wheels 3, which can be deflected by a steering motor 4.

Such a fully hydraulic steering arrangement 1 is known per se. It has a supply connection arrangement with a high-pressure connection P and a low-pressure connection T. Further, it has a working connection arrangement with two working connections L, R, to which the steering motor 4 is connected.

Via a directional valve 5, which can be activated by means of the steering handwheel 2, the steering motor 4 is supplied with pressurised hydraulic fluid. In a manner known per se, the directional valve 5 consists of two slides, which can be reset to a neutral position by a measuring motor 6, through which the hydraulic fluid supplied to the steering motor flows, when the wheels 3 have reached a turning angle corresponding to the deflection of the steering handwheel 2. The directional valve 5 and the measuring motor 6 are essential components in a steering unit 7.

Further provided is a steering valve 8 in the form of a proportional valve. The steering valve 8 is located in parallel with the steering unit 7 between the supply connection arrangement P, T and the working connection arrangement L, R. The steering valve 8 has an auxiliary force actuated drive 9, for example an electric magnet, which can be activated by a control device 10. In a manner not shown in detail, the control device 10 can be connected to an instruction transmitter, for example a joystick. However, it can also be connected with a sensor at the shaft 11 of the steering handwheel 2 and with a steering angle sensor, not shown in detail, at the steering motor 4, for example to support the steering unit 7 when steering the wheels.

In front of the high-pressure inlet P of the steering arrangement 1 is located a priority valve 12, having a priority outlet CF, which ensures a higher priority supply to the steering arrangement 1 of pressurised hydraulic fluid from an inlet P0 of the priority valve 12, when an corresponding demand occurs. Further, the priority valve 12 has an outlet EF, which is connected with a merely schematically shown working hydraulics 13. The outlet EF receives a lower priority supply of pressurised hydraulic oil, that is, only when the steering arrangement 1 has not corresponding demand.

The steering unit 7 has a first load-sensing connection LS1, which is connected with the low-pressure connection T in the neutral position of the directional valve 5.

The steering valve 8 has a second load-sensing connection LS2, which is connected with the high-pressure connection P via a bleed 14. In many cases, the bleed 14 can be avoided. In this case, a "static" steering valve is achieved. In the neutral position of the steering valve 8, the second load-sensing connection LS2 is connected with the low-pressure connection T via non-return valves 15, which are located in the slide 16 of the steering valve 8. In the neutral position of the steering unit 7, that is, in the neutral position of the steering valve 5, the pressure at the low-pressure connection, that is, usually the tank pressure, rules at the first load-sensing connection LS1. Accordingly, in the neutral position of the steering valve 8, the pressure at the low-pressure connection T also rules at the second load-sensing connection LS2.

The priority valve 12 is provided with a third load-sensing connection LS3. Via a throttle arrangement comprising two throttles 17, 18, a central outlet 19 of the third load-sensing connection LS3 is connected with the priority outlet CF of the priority valve 12.

The priority valve 12 has a slide 20, whose one front side is connected with the priority outlet CF via a throttle 21. Upon the opposite front side of the slide 20 acts the pressure at the central outlet 19 between the two throttles 17, 18. Additionally, a spring 22 acts in the direction of this pressure, said spring positioning the slide 20 so that it connects the pressure inlet P0 of the priority valve 12 with the priority outlet CF.

The third load-sensing connection LS3 is connected with the first load-sensing connection LS1 via a pipe 23. In this pipe 23 is located a control valve 24 having a control inlet 25, which is connected with the second load-sensing connection LS2. The control valve 24 can be a valve, whose design is in principle known from the valve PVFC of Sauer-Danfoss ApS, Nordborg, Denmark. This valve throttles the cross-section of the pipe 23 more or less, in dependence of the position of its slide.

Via a spring 26, the control valve 24 is prestressed in the closing direction or the throttling direction, via a control pipe 27 that is connected with the third load-sensing connection LS3, however, loaded in the opening direction.

In a preferred embodiment, the control valve 24 and the steering valve 8 are combined in one component, that is, they have, for example, the same housing.

An overpressure valve 28 in the pipe 23 ensures that excessively high pressures of the third load-sensing connection LS3 are carried off.

With the first load-sensing connection LS1 is connected a pressure switch 29, which again is connected with the control device 10. The pressure switch 29 closes, when a predetermined pressure at the first load-sensing connection LS1 is exceeded. This can, for example, be used to moving the steering valve 8 into the neutral position shown, when the pressure at the first load-sensing connection LS1 exceeds the predetermined limit.

It is also possible that the control valve 24 closes completely. In this case, however, the pressure switch is not active.

The steering arrangement 1 works as follows:

In the neutral position of the steering unit 7, the first load-sensing connection LS1 is, as shown, connected with the low-pressure connection T. Accordingly, a certain, small fluid amount from the pressure inlet P0 of the priority valve 12 currently flows off to tank via the priority outlet CF and the third load-sensing connection LS3 of the priority valve 12. Due to the pressure in the control pipe 27, the control valve 24 is open, so that practically the same pressures rule at the first load sensing connection LS1 and the third load-sensing connection LS3. Load-sensing pressures from the working hydraulics 13 are disconnected from the pipe 23 via a shuttle valve 30.

When, now, the steering unit 7 is activated, the pressure at the first load-sensing connection LS1 increases, so that the slide 20 of the priority valve 12 is at any rate displaced to the priority position shown, in which the priority outlet CF is preferably supplied with pressure fluid.

When, now, the steering valve 8 is activated, the pressure at the second load-sensing connection LS2 increases. This causes that the control valve 24 increasingly throttles the connection between the third load-sensing connection LS3 and the first load-sensing connection LS1, so that the fluid, which should like to flow from the third load-sensing connection LS3 to the first load-sensing connection LS1, is throttled in the control valve 24. This leads to a corresponding pressure increase at the third load-sensing connection LS3, which also causes that the slide 20 of the priority valve 12 is displaced to or retained in the priority position shown. Also when activating the steering valve 8, it is thus possible in a simple manner to receive the working pressure required at the high-pressure connection P from the priority valve 12.

When the steering arrangement 1 is set so that the vehicle can also be controlled merely via the steering valve 8, for example, by a remote control, a user, however, wishing to interfere manually in the steering by activating the steering unit 7, the following situation occurs:

The connection between the third load-sensing connection LS3 and the first load-sensing connection LS1 is throttled, but not interrupted, by the control valve 24. Accordingly, still a small amount of fluid flows to the first load-sensing connection LS1 and off to the low-pressure connection T via the directional valve 5. When, now, the directional valve 5 is moved, the connection between the load-sensing connection LS1 and the low-pressure connection T is interrupted and the pressure at the first load-sensing connection LS1 increases. This pressure increase is detected by the pressure switch 29, which switches over and reports this to the control device 10. The control device 10 is then able to move the control valve 8 back into the neutral position shown.

With the steering arrangement 1 an internal shuttle valve is not required, which passes on the load-sensing pressures from the steering unit 7 or the steering valve 8. Additional bleeds or throttles are not required either, except for the bleed 14. Thus, the steering arrangement has a relatively simple design.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering arrangement with a supply connection arrangement having at least a high-pressure connection and a low-pressure connection, a working connection arrangement having at least two working connections, a steering unit, which can be activated by a steering transducer, the steering unit having a first load-sensing connection, and a steering valve having a second load-sensing connection, the steering unit and the steering valve being arranged in parallel with each other between the supply connection arrangement and the working connection arrangement, wherein a priority valve is connected in series with the high-pressure connection (P), said priority valve having a third load-sensing connection (LS3), which is connected with the first load-sensing connection (LS1) via a pipe, in which is located a control valve that can be activated by the second load-sensing connection (LS2).

2. The hydraulic steering arrangement according to claim 1, wherein the control valve forms a throttle, whose resistance can be changed by the pressure at the second load-sensing connection (LS2).

3. The hydraulic steering arrangement according to claim 1, wherein the priority valve has a connection between its priority outlet (CF) and the third load-sensing connection (LS3), in which a throttle arrangement is located.

4. The hydraulic steering arrangement according to claim 3, wherein the throttle arrangement has a central outlet, whose pressure acts upon a control slide in a direction, in which the priority outlet (CF) is connected with the pressure inlet (P0).

5. The hydraulic steering arrangement according to claim 1, wherein the second load-sensing connection (LS2) is connected with the high-pressure connection (P) via a bleed.

6. The hydraulic steering arrangement according to claim 5, wherein the neutral position of the steering valve, the second load-sensing connection (LS2) is connected with the low-pressure connection (T).

7. The hydraulic steering arrangement according to claim 1, wherein the first load-sensing connection (LS1) is connected with a pressure switch, which changes over, when a predetermined pressure is exceeded.

8. The hydraulic steering arrangement according to claim 7, wherein the pressure switch is connected with a control device (10), which controls the steering valve.

9. The hydraulic steering arrangement according to claim 8, wherein the control device controls the steering valve to its neutral position, when the predetermined pressure is exceeded.

* * * * *